United States Patent
Takahashi et al.

(10) Patent No.: US 9,815,210 B2
(45) Date of Patent: Nov. 14, 2017

(54) ROBOT

(71) Applicant: KABUSHIKI KAISHA YASKAWA DENKI, Kitakyushu-shi (JP)

(72) Inventors: Shingi Takahashi, Fukuoka (JP); Takuya Okada, Fukuoka (JP); Tomoyuki Shiraki, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 290 days.

(21) Appl. No.: 14/155,361

(22) Filed: Jan. 15, 2014

(65) Prior Publication Data

US 2014/0196561 A1 Jul. 17, 2014

Related U.S. Application Data

(60) Provisional application No. 61/759,472, filed on Feb. 1, 2013.

(30) Foreign Application Priority Data

Jan. 17, 2013 (JP) .................................. 2013-006677

(51) Int. Cl.
  *B25J 18/04* (2006.01)
  *B25J 9/10* (2006.01)
  *B25J 17/02* (2006.01)

(52) U.S. Cl.
  CPC ............. *B25J 18/04* (2013.01); *B25J 9/1035* (2013.01); *B25J 17/02* (2013.01); *B25J 17/025* (2013.01); *Y10T 74/20317* (2015.01); *Y10T 74/20335* (2015.01)

(58) Field of Classification Search
  CPC .................. F16H 1/32; A61F 2002/701; A61F 2002/30523; A61F 2002/5069; A61F 2002/704; A61F 2002/0025; B25J 18/04; B25J 9/102; B25J 17/02; Y10T 74/20329
  USPC ........ 74/490.05, 490.06, 490.03; 901/25, 28, 901/29, 15, 36; 414/223.01; 475/162
  See application file for complete search history.

(56) References Cited

U.S. PATENT DOCUMENTS 4,246,661 A * 1/1981 Pinson .................... A61F 2/583
  294/111
4,496,279 A * 1/1985 Langer .................... B25J 9/046
  414/729

(Continued)

FOREIGN PATENT DOCUMENTS

CN 101549494 A 10/2009
CN 102218743 A 10/2011

(Continued)

OTHER PUBLICATIONS

Japanese Office Action for corresponding JP Application No. 2013-006677, dated May 7, 2013.

(Continued)

*Primary Examiner* — David M Fenstermacher
(74) *Attorney, Agent, or Firm* — Mori & Ward, LLP

(57) ABSTRACT

A robot according to an embodiment includes a first link, a second link, an actuator, and an external gear. The second link is rotatably connected to the first link. The actuator rotationally drives the second link. The external gear is connected to the actuator. The second link includes an internal gear engaged with the external gear.

9 Claims, 5 Drawing Sheets

(56) References Cited

U.S. PATENT DOCUMENTS

| | | | | |
|---|---|---|---|---|
| 4,688,984 | A | * | 8/1987 | Nakashima ............ B25J 9/1025 414/735 |
| 4,690,012 | A | * | 9/1987 | Dahlquist ............ B25J 17/0283 74/417 |
| 4,911,033 | A | * | 3/1990 | Rosheim ................ B25J 9/06 475/341 |
| 5,293,107 | A | * | 3/1994 | Akeel .................... B25J 9/08 310/83 |
| 5,656,904 | A | * | 8/1997 | Lander .................. A61F 2/68 318/568.1 |
| 6,795,750 | B2 | * | 9/2004 | Kullborg .............. B25J 17/0283 700/245 |
| 6,976,401 | B2 | * | 12/2005 | Okamoto ............ B25J 17/0283 74/490.02 |
| 7,230,402 | B2 | * | 6/2007 | Kumagai ................ B25J 17/00 318/568.11 |
| 7,253,578 | B2 | * | 8/2007 | Kumagai ................ B25J 17/00 318/568.11 |
| 8,920,278 | B2 | * | 12/2014 | Tanaka .................. F16H 1/32 475/149 |
| 2001/0044356 | A1 | * | 11/2001 | Takeuchi ................ F16H 1/32 475/178 |
| 2007/0137370 | A1 | | 6/2007 | Ichibangase et al. |
| 2008/0295623 | A1 | * | 12/2008 | Kurita .................... B25J 9/102 74/25 |
| 2009/0326677 | A1 | * | 12/2009 | Phillips .................. A61F 2/585 623/24 |
| 2011/0028259 | A1 | * | 2/2011 | Miyoshi ................ B25J 9/102 475/162 |
| 2011/0132433 | A1 | * | 6/2011 | Tanaka .................... F16H 1/32 136/246 |
| 2011/0252915 | A1 | | 10/2011 | Nakagiri et al. |
| 2012/0176007 | A1 | * | 7/2012 | Takeuchi ............... H02K 7/116 310/68 B |
| 2012/0235606 | A1 | * | 9/2012 | Takeuchi ............. H02K 7/1023 318/371 |
| 2012/0269311 | A1 | | 10/2012 | Togasawa et al. |
| 2014/0206497 | A1 | * | 7/2014 | Nakamura ................ F16H 1/32 475/331 |

FOREIGN PATENT DOCUMENTS

| | | |
|---|---|---|
| CN | 101549494 B | 5/2012 |
| JP | 51-129938 U | 10/1976 |
| JP | 53-111172 U | 9/1978 |
| JP | 63-058873 U | 4/1988 |
| JP | 4529456 B2 | 7/2005 |
| JP | 2008-073775 | 4/2008 |
| JP | 2010-038323 | 2/2010 |
| JP | 2011-089929 | 5/2011 |

OTHER PUBLICATIONS

Japanese Office Action for corresponding JP Application No. 2013-006677, dated Aug. 13, 2013.
Chinese Office Action for corresponding CN Application No. 201410017319.5, dated Apr. 30, 2015.
Chinese Office Action for corresponding CN Application No. 201410017319.5, dated Dec. 31, 2015.

* cited by examiner

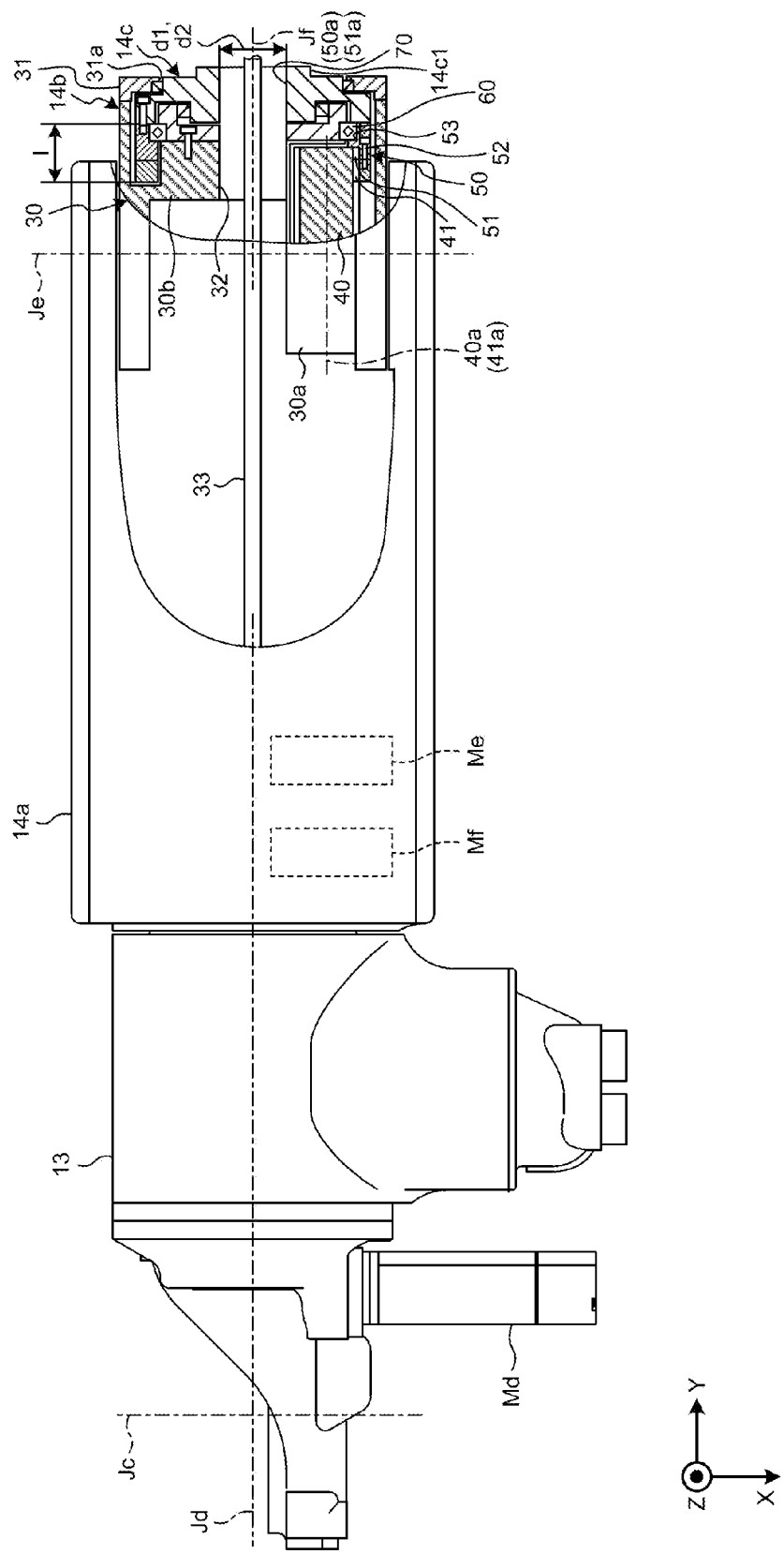

ROBOT

CROSS-REFERENCE TO RELATED APPLICATIONS

This application is based upon and claims the benefit of priority of the prior Japanese Patent Application No. 2013-006677, filed on Jan. 17, 2013; and U.S. Provisional Patent Application No. 61/759,472, filed on Feb. 1, 2013, the entire contents of both of which are incorporated herein by reference.

FIELD

The embodiment discussed herein is directed to a robot.

BACKGROUND

Conventionally, industrial robots have been developed that include a plurality of links rotatably connected to each other and are configured to cause an actuator to rotationally drive the links to perform a predetermined operation using an end effector (for example, a torch for arc welding) attached to an end of one of the links (see Japanese Patent Application Laid-open No. 2008-73775, for example).

In the technique disclosed in Japanese Patent Application Laid-open No. 2008-73775, a robot includes an external gear connected to an actuator and an external gear connected to a link and is configured to engage the two external gears with each other to transfer the drive force of the actuator to the link, causing the link to perform rotational drive.

However, the configuration described above is associated with a concern that the connection part between the actuator and the link in the robot will be enlarged in the direction perpendicular to the rotation axis of the gears, in other words, in the radial direction of the gears. More specifically, when the two external gears are engaged with each other, there is a concern that the connection part between the actuator and the link will be enlarged because the entire width of the gears in the radial direction is approximately the value obtained by adding the outer diameter of one external gear with that of the other external gear.

If the entire body of a robot is large due to a large connection part between an actuator and a link as described above, the robot may interfere with a workpiece, for example, in performing a predetermined operation. Reduction in the size of connection parts has been therefore desired.

SUMMARY

According to one aspect of an embodiment, a robot includes a first link, a second link, an actuator, and an external gear. The second link is rotatably connected to the first link. The actuator rotationally drives the second link. The external gear is connected to the actuator. The second link includes an internal gear that is engaged with the external gear.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 6 is a partial sectional top view illustrating only a vicinity of an upper arm, a first wrist, a second wrist, and a third wrist in a modification of the robot according to the embodiment.

DESCRIPTION OF EMBODIMENT

Figure 1:
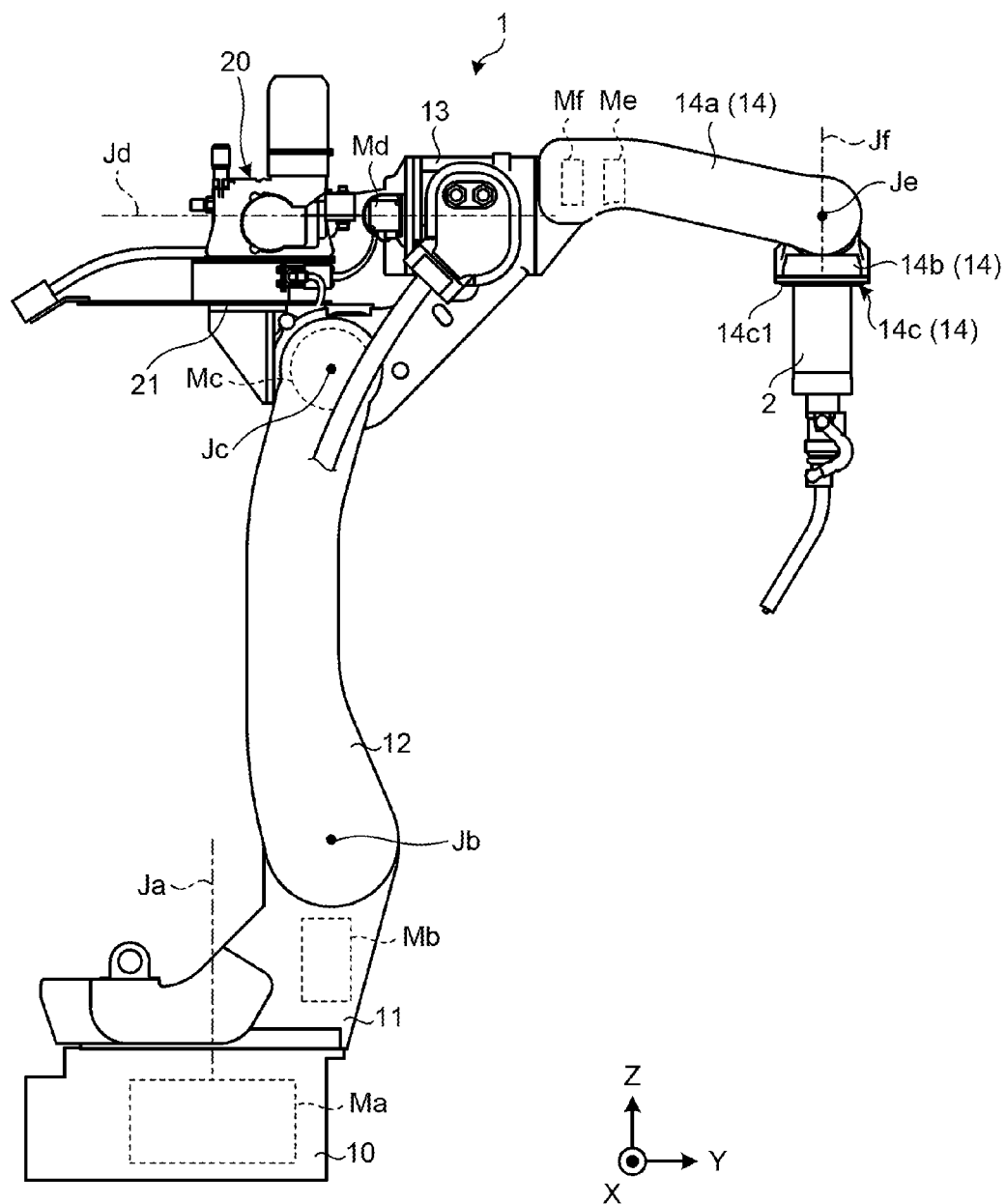
FIG. 1 is a side view illustrating a robot according to an embodiment.

FIG. 1 is a side view illustrating a robot according to an embodiment. For the sake of explanation, FIG. 1 includes a three-dimensional rectangular coordinate system having the Z axis of which the upward vertical direction is defined as the positive direction and the downward vertical direction is defined as the negative direction, the Y axis defined as the horizontal direction on the paper, and the X axis defined as the frontward direction from the back side of the paper. Such a rectangular coordinate system is shown in some other drawings used for the description below. In addition, the description below explains a structure of the robot using the expressions "X axis direction", "Y axis direction", and "Z axis direction". It should be noted that the "X axis direction", "Y axis direction", and "Z axis direction" are applied only where the robot is in the posture illustrated in each drawing and are not intended to limit the directions of the robot.

As illustrated in FIG. 1, a robot 1 is an industrial robot for arc welding having a torch 2 for arc welding, for example, attached to an end thereof as an end effector. The robot 1 is also an articulated robot including a plurality of links and a plurality of joint axes (hereinafter, also referred to as "rotation axes") Ja to Jf connecting each of the links. The robot 1 includes, as the links, a base 10, a rotary section 11, a lower arm 12, an upper arm 13, and a wrist section 14 consisting of a first wrist 14a, a second wrist 14b, and a third wrist 14c, each of which is rotatably connected to each other.

Specifically, the rotary section 11 is connected to the base 10 rotatably around the rotation axis Ja, and the lower arm 12 is connected to the rotary section 11 rotatably around the rotation axis Jb that is perpendicular to the rotation axis Ja. The upper arm 13 is connected to the lower arm 12 rotatably around the rotation axis Jc that is parallel with the rotation axis Jb, and the first wrist 14a is connected to the upper arm 13 rotatably around the rotation axis Jd that is perpendicular to the rotation axis Jc.

The second wrist (a first link) 14b is connected to the first wrist 14a rotatably around the rotation axis Je that is perpendicular to the rotation axis Jd, and the third wrist (a second link) 14c is connected to the second wrist 14b rotatably around the rotation axis Jf that is perpendicular to the rotation axis Je. As described above, the third wrist 14c corresponds to link means.

It should be noted that the terms "perpendicular" and "parallel" in the description above as well as "horizontal" in the description below are not intended to require stringent accuracy in a mathematical sense but shall allow substantial tolerances and errors. In addition, the term "perpendicular"

herein used is intended to mean cases where the relation between two straight lines (rotation axes) are skew lines as well as cases where two straight lines (rotation axes) are perpendicular to each other on a plane.

The robot 1 includes actuators Ma to Mf that rotationally drive the rotary section 11, the lower arm 12, the upper arm 13, the first wrist 14a, the second wrist 14b, and the third wrist 14c described above. Each of the actuators Ma to Mf is a servo motor, for example, in concrete terms.

Although the actuators Ma to Mf are servo motors in the description above, the actuators Ma to Mf should not be limited to servo motors but may be other kind of motors such as hydraulic motors. The actuators will be referred to as "motors" in the description below.

To explain each of the motors Ma to Mf, the motor Ma attached to the base 10 is connected to the rotary section 11 to rotationally drive the rotary section 11. The motor Mb attached to the rotary section 11 is connected to the lower arm 12 to rotationally drive the lower arm 12. The motor Mc attached to the lower arm 12 is connected to the upper arm 13 to rotationally drive the upper arm 13. The motor Md attached to the upper arm 13 is connected to the wrist section 14, or more specifically, to the first wrist 14a to rotationally drive the first wrist 14a in the wrist section 14.

The motor Me and the motor Mf both are attached to the first wrist 14a. The motor Me is connected to the second wrist 14b through a pulley or a gear (either not illustrated) that transfers the drive force of the motor Me to the second wrist 14b to rotationally drive the second wrist 14b. The motor Mf is connected to the third wrist 14c through a pulley (not illustrated) or a gear (not illustrated in FIG. 1) that transfers the drive force of the motor Mf to the third wrist 14c to rotationally drive the third wrist 14c. As described above, the motor Mf corresponds to means for outputting a drive force to rotate the third wrist (the link means) 14c.

The third wrist 14c includes a wrist flange 14c1 to which the torch 2 described above is attached. It should be noted that this third wrist 14c and the above-described configuration for transferring the drive force of the motor Mf to the third wrist 14c will be further described below in detail.

Input into the motors Ma to Mf described above is a signal representing an operation instruction from a controller (not illustrated). Based on the signal, the operation is controlled. With the operation of the motor Ma to Mf controlled, the robot 1 brings the torch 2 near the object to be welded and generates an arc from the torch 2 while changing the position, the angle, and other conditions of the torch 2, for example, to perform arc welding.

The robot 1 further includes a feeder 20 that feeds a torch wire (not illustrated in FIG. 1) serving as a welding material for arc welding to the torch 2. The feeder 20 is disposed on the rear side of the upper arm 13 that is also the upper side in the perpendicular direction of the lower arm 12 (the positive side of the Z axis direction in FIG. 1). More specifically, disposed on the upper side in the perpendicular direction of the lower arm 12 is a table 21 including a mounting face that is parallel with the XY axis plane. The feeder 20 is attached to the mounting face of the table 21.

In a robot as described above, reduction in the size of the connection part between a motor and a link (the third wrist, for example) has been desired conventionally. In other words, it is desirable that the above described connection part be as small as possible because a large connection part between a motor and a link will enlarge the entire robot and may cause the robot to interfere with a workpiece, for example, in performing a predetermined operation.

From the above-described background, the robot 1 according to the present embodiment is configured such that the connection part between the motor and the link, or the connection part between the motor Mf and the third wrist 14c more specifically, can be as small as possible. The configuration will be described below in detail.

Figure 2:
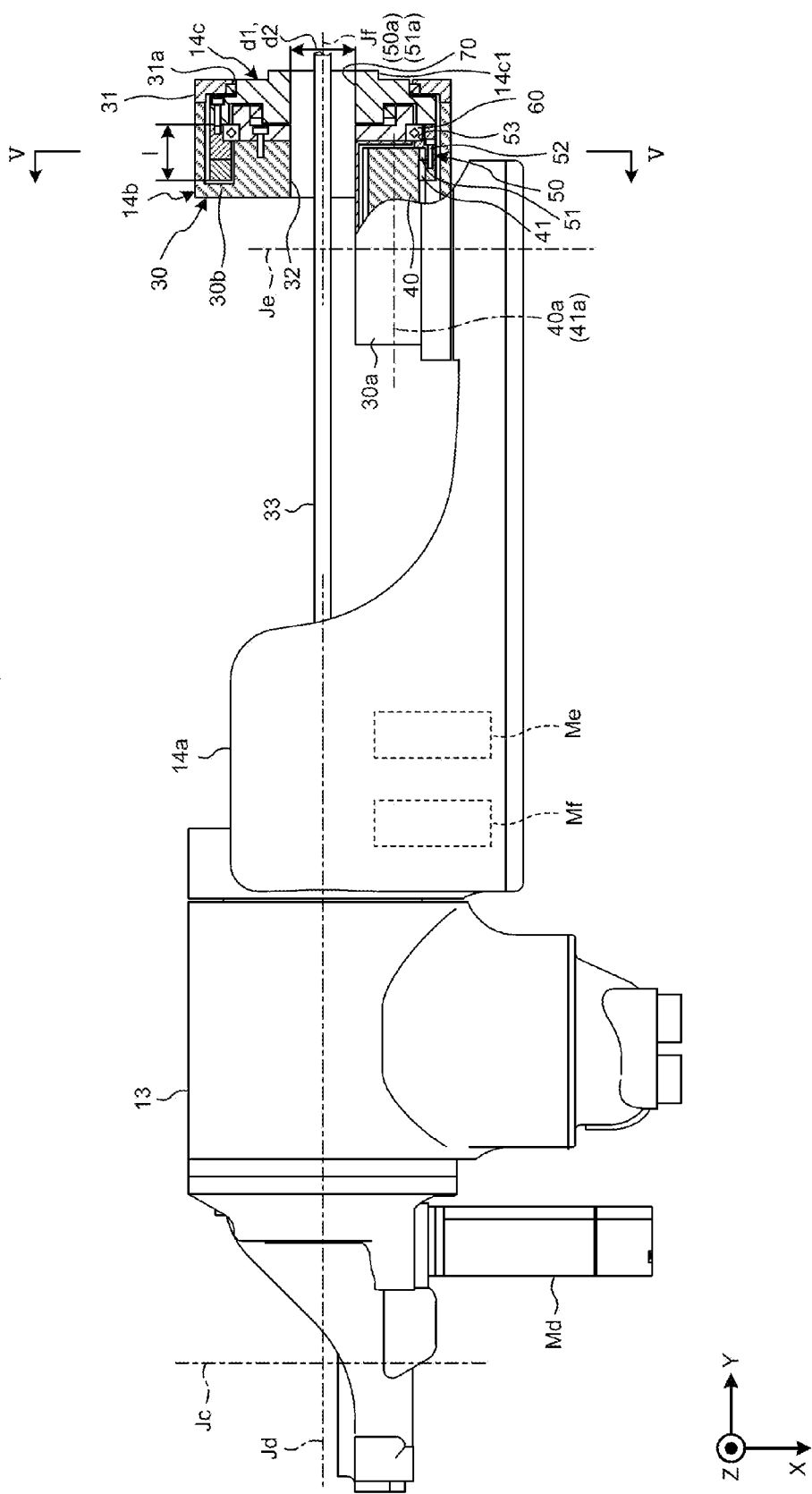
FIG. 2 is a partial sectional top view illustrating only a vicinity of an upper arm, a first wrist, a second wrist, and a third wrist illustrated in FIG. 1.
Figure 3:
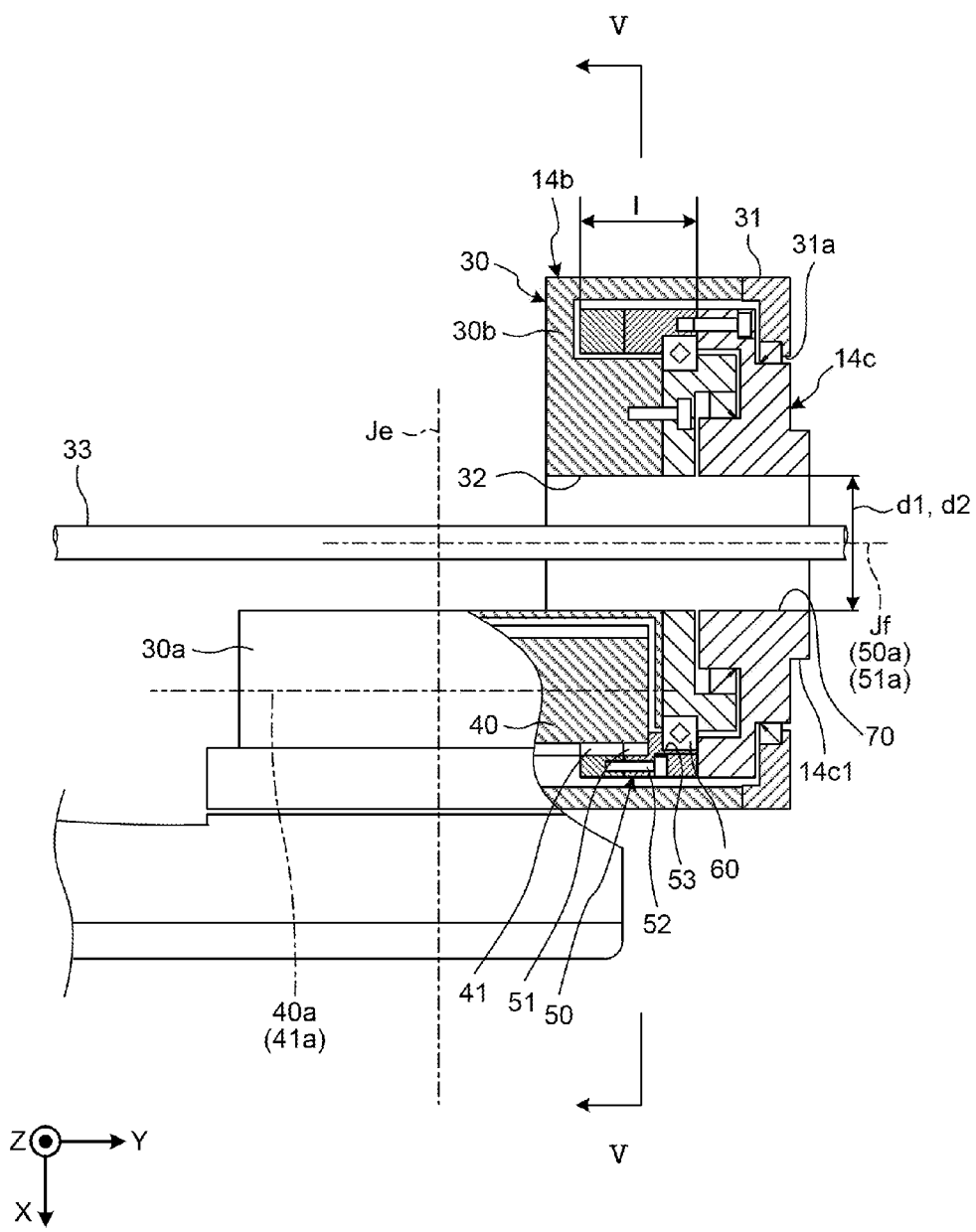
FIG. 3 is a close-up partial sectional top view illustrating in a close-up manner a vicinity of the second wrist and the third wrist illustrated in FIG. 2.
Figure 4:
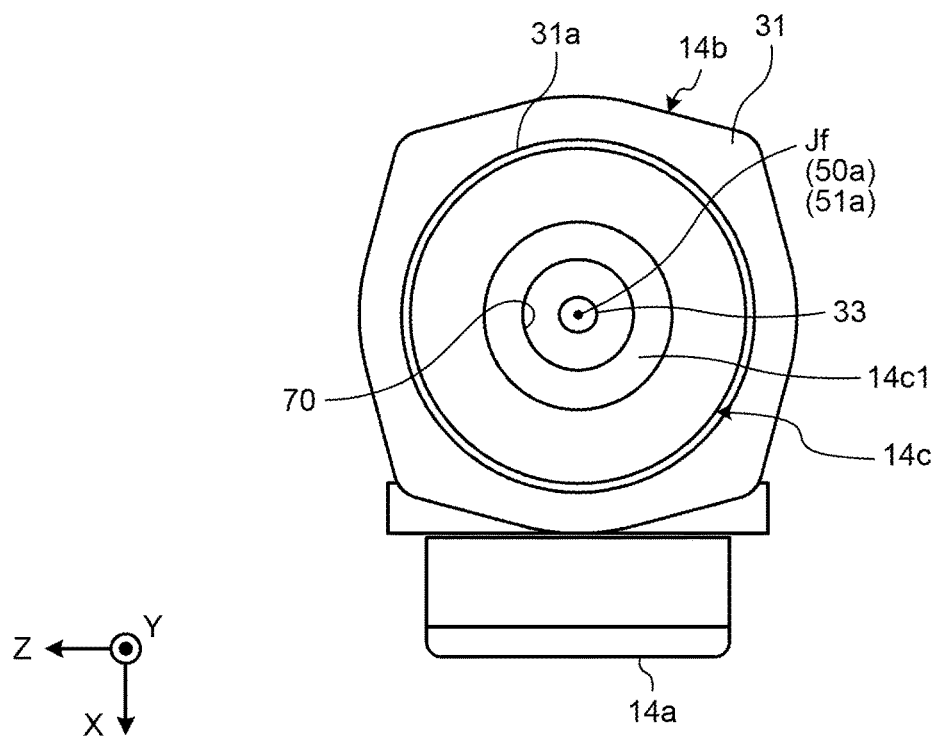
FIG. 4 is a side view of the first wrist, the second wrist, and the third wrist illustrated in FIG. 2.

FIG. 2 is a partial sectional top view illustrating only a vicinity of the upper arm 13, the first wrist 14a, the second wrist 14b, and the third wrist 14c illustrated in FIG. 1. FIG. 3 is a close-up partial sectional top view illustrating in a close-up manner a vicinity of the second wrist 14b and the third wrist 14c illustrated in FIG. 2. FIG. 4 is a side view of the first wrist 14a, the second wrist 14b, and the third wrist 14c illustrated in FIG. 2 viewed from the positive side in the Y axis direction.

It should be noted that the lower arm 12 and the torch 2, for example, are not illustrated in FIGS. 2 to 4 in order to simplify the illustration. Furthermore, illustrated in FIGS. 2 to 4 is the second wrist 14b having been rotated by 90 degrees around the rotation axis Je to be horizontal, that is, in the posture that the rotation axis Jd is coaxial with the rotation axis Jf.

The robot 1 includes a body 30, a driving-side shaft 40, and a driven-side shaft 50 that constitute the second wrist 14b, as illustrated in FIGS. 2 and 3. The body 30 has a hollow space inside thereof and a side face that is open (specifically, the positive side in the Y axis direction in FIGS. 2 and 3), to which a side face cover 31 is attached.

The body 30 is formed in an approximate L shape as viewed in a top view from the Z axis direction. Specifically, the body 30 includes one end part 30a of which the longitudinal direction as viewed from the top is parallel with the Y axis direction and another end part 30b that is formed continuously from the one end part 30a and of which the longitudinal direction as viewed from the top is parallel with the X axis direction.

The body 30 is rotatably connected to the first wrist 14a on one surface side of the one end part 30a. Thus, the first wrist 14a and the second wrist 14b are connected at one position on the one end part 30a to form what is called a cantilever structure.

The other end part 30b includes a hollow part 32 defining a hollow portion along the Y axis direction. A hollow diameter d1 of the hollow part 32 is set to a value with which a conduit cable 33 extending from the feeder 20 to the torch 2 can be inserted. Furthermore, the one end part 30a is formed in a shape in which the one end part 30a does not overlap with the hollow part 32 in the X axis direction. The side face cover 31 has an opening 31a through which the third wrist 14c is inserted, as well illustrated in FIG. 4.

In the space inside the body 30, the driving-side shaft 40 and the driven-side shaft 50 described above are arranged. The driving-side shaft 40 is arranged with the shaft line 40a perpendicular to the rotation axis Je of the second wrist 14b and parallel with the rotation axis Jf of the third wrist 14c and is rotatably supported by the body 30.

The driving-side shaft 40 is connected to the motor Mf through a pulley or a gear, for example, although illustration of the connection is omitted. The driving-side shaft 40, to which the drive force of the motor Mf is thus transmitted, is then rotated around the shaft line 40a.

Figure 5:
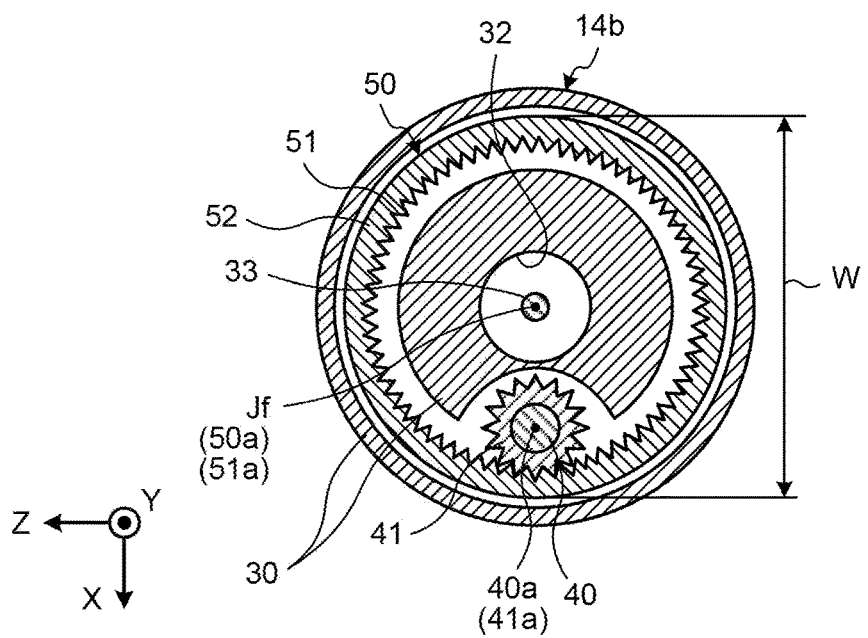
FIG. 5 is a close-up end view taken along line V-V in FIG. 2.

FIG. 5 is a close-up end view taken along line V-V in FIG. 2. As well illustrated in FIG. 5, integrally attached to the driving-side shaft 40 is an external gear 41 with cogs formed on the outer circumference thereof. With this configuration, the external gear 41 is rotated around the rotation axis 41a as the driving-side shaft 40 is rotated. Thus, the external gear 41 is connected to the motor Mf through the driving-side shaft 40 and rotated by the drive force of the motor Mf. As described above, the external gear 41 corresponds to first rotation means configured to be rotated by the drive force of the motor Mf.

The rotation axis 41a of the external gear 41 is coaxial with the shaft line 40a of the driving-side shaft 40, that is, in parallel with the rotation axis Jf. It should be noted that the external gear 41 may be but should not be limited to a spur gear, and may be other type of gear such as a helical gear.

The driven-side shaft 50 is arranged with the shaft line 50a oriented in the direction perpendicular to the rotation axis Je and coaxial with the rotation axis Jf of the third wrist 14c. In other words, the driven-side shaft 50 and the driving-side shaft 40 are arranged so that their respective shaft lines 50a and 40a are parallel with each other.

As illustrated in FIG. 5, the driven-side shaft 50 is formed in a cylindrical shape and has an internal gear 51 formed on the inner circumference thereto, which is engaged with the external gear 41. The driven-side shaft 50, to which the drive force of the motor Mf is thus transmitted from the external gear 41 of the driving-side shaft 40, is then rotated around the shaft line 50a. It should be noted that the rotation axis 51a of the internal gear 51 is coaxial with the shaft line 50a of the driven-side shaft 50 and the rotation axis Jf. As described above, the internal gear 51 corresponds to second rotation means configured to be rotated in connection with rotation of the external gear (the first rotation means) 41 to rotate the third wrist (the link means) 14c. Furthermore, the inner diameter of the internal gear (the second rotation means) 51 includes the outer diameter of the external gear (the first rotation means) 41.

The configuration described above can make the width of the entire gear small in the radial direction (shown with the symbol W in FIG. 5). In other words, if the driven-side shaft includes an external gear and the driving-side shaft and the driven-side shaft are connected to each other with respective external gears engaged with each other, for example, the width W of the entire gear is approximately the total of the outer diameters of the two external gears, enlarging the width W.

In the robot 1 according to the present embodiment, since the driven-side shaft 50 has the internal gear 51 that is in contact with the external gear 41 inside the driven-side shaft 50, the width W of the entire gear corresponds to the outer diameter of the driven-side shaft 50 alone, making the width W small.

As will be described below, the driven-side shaft 50 is connected to the third wrist 14c, and accordingly, this connection part between the driving-side shaft 40 and the driven-side shaft 50 corresponds to the connection part between the motor Mf and the third wrist 14c described above. In the robot 1 according to the present embodiment with the external gear 41 and the internal gear 51 included as described above, the size of the connection part between the motor Mf and the third wrist 14c can be thus reduced.

Furthermore, because the robot 1 is configured such that the internal gear 51 is included in the third wrist 14c, which is the endmost link in the wrist section 14 including a plurality of links, as well as the external gear 41 is connected to the motor Mf, the size of the part nearest the end effector in the robot 1 can be reduced. With this configuration, the third wrist 14c and the torch 2, which is the end effector, for example, can be moved to a workpiece located in a relatively narrow space, improving the accessing capability of the robot 1.

It should be noted that the internal gear 51 may be but should not be limited to a scissors gear, for example, and may be other type of gear such as a spur gear or a helical gear if cogs are formed on the inner circumference side of the driven-side shaft 50.

Furthermore, the internal gear 51 is provided at a region 52 where the inner circumference face of the driven-side shaft 50 overlaps the external gear 41 in the direction of the rotation axis 51a, but not at the other region 53. In other words, the inner circumference face of the driven-side shaft 50 includes two kinds of regions in the direction of the shaft line 50a, which are the region 52 on which the cogs of the internal gear 51 are formed (hereinafter, referred to as a "forming region 52") and the region 53 on which the cogs of the internal gear 51 are not formed (hereinafter, referred to as a "non-forming region 53").

Disposed inside the driven-side shaft 50 is a bearing 60 that rotatably supports the driven-side shaft 50. This configuration can prevent enlargement of the connection part between the motor Mf and the third wrist 14c.

In other words, if the bearing 60 is disposed outside the driven-side shaft 50 as viewed from the direction of the shaft line 50a, the connection part is enlarged in the direction perpendicular to the shaft line 50a by the size of the bearing 60. The configuration described above can prevent the enlargement of the connection part.

Furthermore, the bearing 60 is disposed so as to abut the inner circumference face of the non-forming region 53 of the driven-side shaft 50. Thus, the thickness of the non-forming region 53 in the direction perpendicular to the shaft line 50a (i.e., the thickness in the radial direction) can be smaller than that of the forming region 52, and can be further reduced to the value with which the load applied from the bearing 60 can be tolerated, thereby reducing the size and weight of the driven-side shaft 50.

Furthermore, due to the reduced thickness of the non-forming region 53 in the radial direction, the hollow part at the inner circumference side of the driven-side shaft 50 can be enlarged. Through the hollow part of the driven-side shaft 50, the conduit cable 33 is inserted as illustrated. In this regard, such an enlarged hollow part as described above can house a relatively thick conduit cable such as a cable used for a servo torch or a tandem torch. With this configuration, the robot 1 can be adapted to various types of welding.

Furthermore, the bearing 60 is disposed adjacent to the forming region 52, on which the cogs of the internal gear 51 are formed, in the direction of the rotation axis 51a of the internal gear 51 on the inner circumference face of the driven-side shaft 50. With this configuration, the length 1 of the driven-side shaft 50 and the bearing 60 in the direction of the rotation axis 51a can be shortened, thereby further reducing the size of the connection part between the motor Mf and the third wrist 14c.

The driven-side shaft 50 is integrally connected to the wrist flange 14c1. In other words, the third wrist 14c includes the driven-side shaft 50. With this configuration, the drive force of the motor Mf is transmitted to the wrist flange 14c1 through the driving-side shaft 40, the external gear 41, the internal gear 51, and the driven-side shaft 50 to rotationally drive the wrist flange 14c1.

Furthermore, the pitch diameter of the external gear 41 is set smaller than that of the internal gear 51, for example, to approximately one third or less of the pitch diameter of the internal gear 51. With this configuration, the drive force of the motor Mf can be substantially shifted or, more specifically, slowed down between the external gear 41 and the internal gear 51 while the hollow part at the inner circumference side of the driven-side shaft 50 described above can be reliably secured. It should be noted that the pitch diameter of each gear described above is merely an example and is not intended to limit the embodiment. For example, the pitch diameter of the external gear 41 can be greater than one third of that of the internal gear 51.

Furthermore, the wrist flange 14c1 of the third wrist 14c includes a hollow part 70 formed into a hollow shape, as illustrated in FIG. 4. A hollow diameter d2 of the hollow part 70 is set to a value that is approximately the same as the hollow diameter d1 of the hollow part 32, that is, a value with which the conduit cable 33 can be inserted. With this configuration, the conduit cable 33 can be easily inserted through the hollow part 32, the hollow part at the inner circumference side of the driven-side shaft 50, and the hollow part 70.

Furthermore, the hollow part 70 and the external gear 41 are located so as not to overlap with each other as viewed from the direction of the rotation axis 41a of the external gear 41, as illustrated in FIGS. 2, 3, and 5. In other words, the external gear 41 is located so as to be apart from the hollow part 70 by a predetermined distance in the direction perpendicular to the rotation axis 41a. With this configuration, the hollow diameter d2 of the hollow part 70 can be enlarged, whereby the conduit cable 33 can be inserted through the hollow part 70 more easily.

As described above, in the present embodiment, the robot 1 includes the external gear 41 connected to the motor Mf, and the third wrist 14c includes the internal gear 51 engaged with the external gear 41. This configuration can reduce the size of the connection part between the motor Mf and the third wrist 14c.

In the embodiment described above, the connection part between the motor Mf and the third wrist 14c includes the external gear 41 and the internal gear 51. However, the embodiment is not limited thereto. More specifically, an external gear and an internal gear may be included in the connection part between the motor Ma and the rotary section 11, the motor Mb and the lower arm 12, the motor Mc and the upper arm 13, the motor Md and the first wrist 14a, or the motor Me and the second wrist 14b, for example.

In the robot 1, the connection part between the first wrist 14a and the second wrist 14b has a cantilever structure. However, the embodiment is not limited thereto. For example, the first wrist 14a and the second wrist 14b may be connected as illustrated in FIG. 6. More specifically, the connection part between the first wrist 14a and the second wrist 14b may form a center impeller structure in which the first wrist 14a is formed into a fork shape on one side to which the second wrist 14b is connected and the fork-shaped region rotatably supports the second wrist 14b from both sides, as illustrated in FIG. 6.

The robot 1 is configured as a robot for arc welding. However, the embodiment is not limited to such a configuration. The robot 1 may be other type of robot. Specifically, although the robot 1 includes the torch 2 as an end effecter in the configuration described above, the robot may include a hand for holding a workpiece or an suction section for sucking and retaining a workpiece as an end effector and perform operations such as delivery of the workpiece using the hand or other part.

The robot 1 has been described as a six-axis robot. However, the embodiment is not limited to such a configuration. A robot that has a structure other than a six-axis structure, for example, a seven-axis or an eight-axis robot may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
a first link;
a second link rotatably connected to the first link and having an internal gear provided on a cylindrical shaft;
a bearing disposed on an inner circumference face of the cylindrical shaft so as to rotatably support the cylindrical shaft;
an actuator to rotate the second link; and
an external gear connected to the actuator, the internal gear engaging with the external gear, wherein
the cylindrical shaft includes a first region including teeth of the internal gear formed thereon and a second region not including teeth of the internal gear, the second region being adjacent to the first region in an axial direction of the internal gear, and
the bearing abuts on the second region and is disposed adjacent to the first region in the axial direction of the internal gear.

2. The robot according to claim 1, further comprising a wrist section that includes the first and second links,
wherein the second link is an endmost link of the wrist section.

3. The robot according to claim 2, wherein the second link includes a hollow part formed into a hollow shape.

4. The robot according to claim 3, wherein the external gear is located so as not to overlap the hollow part as viewed from the axial direction of the external gear.

5. The robot according to claim 1, wherein the second link includes a hollow part formed into a hollow shape.

6. The robot according to claim 5, wherein the external gear is located so as not to overlap the hollow part as viewed from the axial direction of the external gear.

7. The robot according to claim 1, further comprising:
a rotary section rotatably connected to a base;
an arm section rotatably connected to the rotary section; and
a wrist section rotatably connected to the arm section, the wrist section including:
the first link;
the second link having the internal gear;
the cylindrical shaft having the first region and the second region;
the bearing;
the actuator; and
the external gear.

8. A robot comprising:
link means;
means for outputting a drive force to rotate the link means;
first rotation means for rotating by the drive force; and
second rotation means for rotating with rotation of the first rotation means to rotate the link means, the second rotation means being provided on a cylindrical shaft, a bearing being disposed on an inner circumference face of the cylindrical shaft so as to rotatably support the cylindrical shaft, an inner diameter of the second rotation means including an outer diameter of the first rotation means, the second rotation means having an internal gear provided on the cylindrical shaft, wherein the cylindrical shaft includes a first region including teeth of the internal gear formed thereon and a second region not including teeth of the internal gear, the second region being adjacent to the first region in an axial direction of the internal gear, and the bearing abuts on the second region and is disposed adjacent to the first region in the axial direction of the internal gear.

9. The robot according to claim 8, further comprising:

a rotary section rotatably connected to a base;

an arm section rotatably connected to the rotary section; and a wrist section rotatably connected to the arm section, the wrist section including:

the link means;

the means for outputting the drive force;

the cylindrical shaft having the first region and the second region;

the first rotation means;

the second rotation means having the internal gear; and the bearing.

\* \* \* \* \*